United States Patent [19]

Martin et al.

[11] Patent Number: 5,759,218
[45] Date of Patent: Jun. 2, 1998

[54] POINT OF FILL AIR SYSTEM

[75] Inventors: Blake E. Martin, Chilton; Richard D. Palmer, Waco, both of Tex.; Robert P. Wood, San Ramon, Calif.

[73] Assignee: Allergan, Waco, Tex.

[21] Appl. No.: 740,099

[22] Filed: Oct. 24, 1996

[51] Int. Cl.⁶ ............................................. B01D 46/00
[52] U.S. Cl. .................. 55/385.1; 55/385.2; 55/DIG. 29;
53/425; 53/561; 53/574; 264/525; 264/542;
425/210; 425/524; 425/534; 425/535; 454/187;
454/191
[58] Field of Search ........................... 55/385.1, 385.2,
55/392, 431, DIG. 29, DIG. 18; 454/187,
188, 190, 191; 264/85, 540, 525, 542; 425/524,
210, 225, 235, 531, 532, 534, 535; 53/561,
140, 425, 426, 167, 574

[56] References Cited

U.S. PATENT DOCUMENTS

| | | | |
|---|---|---|---|
| Re. 27,155 | 7/1971 | Hansen | 18/5 BF |
| 3,071,918 | 1/1963 | Hofstetter | 55/DIG. 29 |
| 3,251,915 | 5/1966 | Pechtold | 264/94 |
| 3,286,303 | 11/1966 | Sherman | 264/542 |
| 3,464,085 | 9/1969 | Burkett et al. | 18/5 |
| 3,523,401 | 8/1970 | Hansen | 53/141 |
| 3,597,793 | 8/1971 | Weiler et al. | 18/5 |
| 3,650,678 | 3/1972 | Hansen | 53/140 |
| 3,664,793 | 5/1972 | Hansen | 425/186 |
| 3,674,405 | 7/1972 | Hansen | 425/308 |
| 3,712,784 | 1/1973 | Siard et al. | 264/525 |
| 3,785,116 | 1/1974 | Munz et al. | 425/524 |
| 3,814,783 | 6/1974 | Dardaine et al. | 53/140 |
| 3,827,214 | 8/1974 | Naumann | 425/524 |
| 3,911,640 | 10/1975 | Rausing | 53/167 |
| 3,919,374 | 11/1975 | Komendowski | 264/90 |
| 4,014,158 | 3/1977 | Rausing | 53/167 |
| 4,026,982 | 5/1977 | Dardaine et al. | 264/525 |
| 4,176,153 | 11/1979 | Weiler et al. | 264/524 |
| 4,178,976 | 12/1979 | Weiler et al. | 150/0.5 |
| 4,191,543 | 3/1980 | Peters | 55/385.1 |
| 4,208,852 | 6/1980 | Pioch | 425/535 |
| 4,336,015 | 6/1982 | Rainville | 425/210 |
| 4,671,762 | 6/1987 | Weiler et al. | 425/524 |
| 4,880,581 | 11/1989 | Dastoli et al. | 264/525 |
| 4,946,366 | 8/1990 | Dundas et al. | 264/525 |
| 5,015,425 | 5/1991 | Mimata et al. | 425/225 |
| 5,068,075 | 11/1991 | Dundas et al. | 264/525 |

FOREIGN PATENT DOCUMENTS

| | | | |
|---|---|---|---|
| 759448 | 4/1971 | Belgium | 53/561 |
| 530981 | 7/1955 | Italy | 53/561 |
| 1-320011 | 12/1989 | Japan | 425/210 |
| 4-44902 | 2/1992 | Japan | 264/525 |

*Primary Examiner*—Duane S. Smith
*Attorney, Agent, or Firm*—Walter A. Hackler

[57] ABSTRACT

In an apparatus for extruding plastic into a length of parison in the form of a vertically oriented hollow tube, molding a container from the parison and for filling the container with liquid product, the apparatus having a extruder, with a parison head, for forming the parison, a hot knife for cutting the parison to a selected length with concomitant release of plastic particulates, gripping apparatus for maintaining an opening at a top of the cut parison, a sealer for sealing a bottom of the cut parison, vacuum apparatus for molding the container with a temporary top opening, an extendable and retractable nozzle for filling the molded container through the temporary top opening with the liquid product and a sealer for sealing the filled container, the improvement including an outer shroud for surrounding the extruder, including the parison head, with H.E.P.A. filtered air, an inner shroud, in communication with a vacuum exhaust and disposed around the parison head, for preventing the particulates from entering the parison upon cutting thereof by the hot knife, and a third shroud, surrounding the nozzle, for directing H.E.P.A. filtered air into the molded container before and during liquid filling thereof.

20 Claims, 4 Drawing Sheets

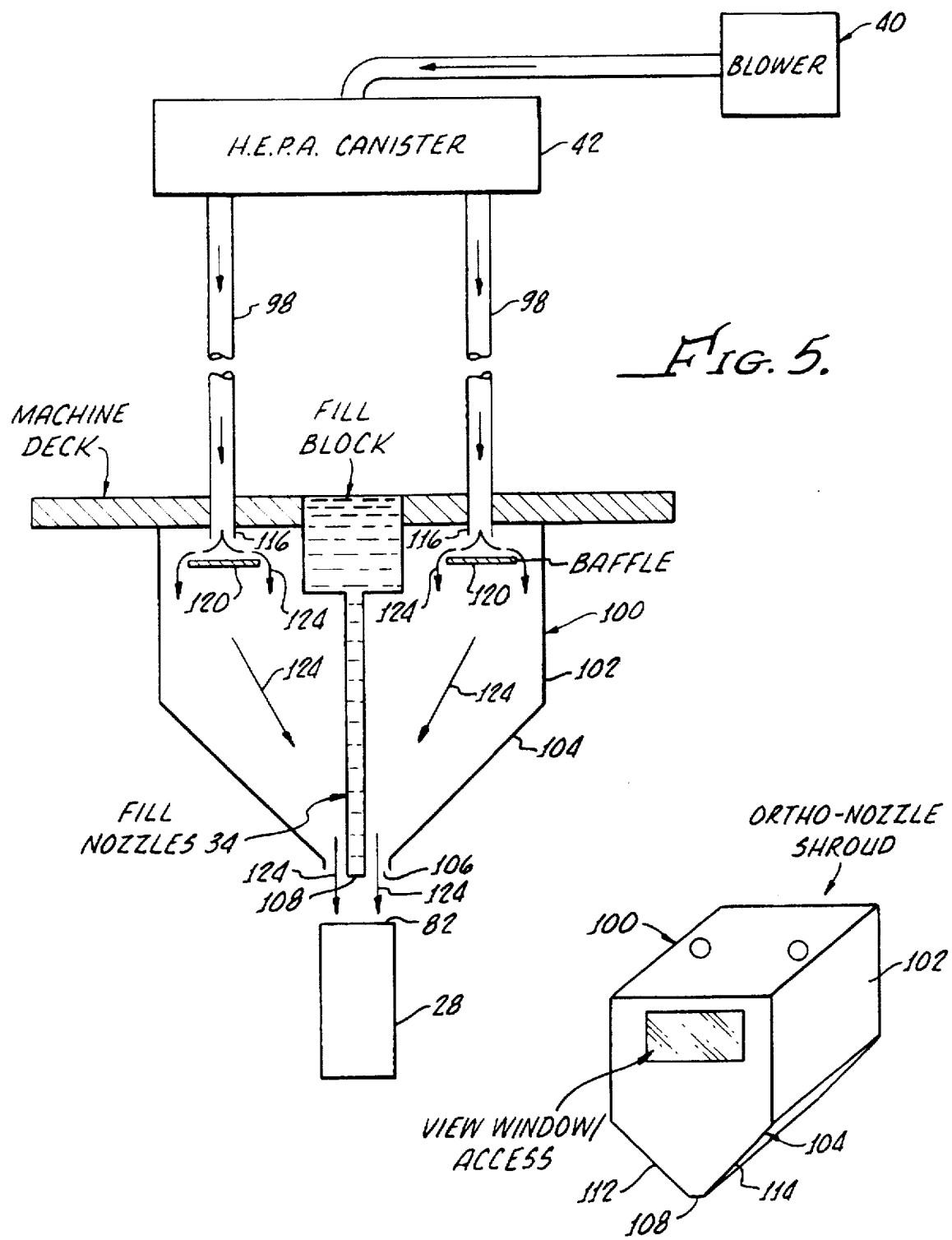

POINT OF FILL AIR SYSTEM

The present invention generally relates to an improvement in the filling of a molded container with liquid product through an automatic filling machine wherein an extruded length of parison is first molded to form a container, sealed at one end, filled, and subsequently sealed.

More particularly the present invention is directed to a point of fill air system for the retrofit of existing machines as hereinabove described in order that the Class 100 air quality specifications as set forth by the FDA may be met to enable the machines to fill molded containers with FDA controlled pharmaceutical products.

Various patents disclose methods and apparatus for forming, molding, and filling a container. See, for example, U.S. Pat. Nos. 3,251,915, 3,464,085, 3,523,401, 3,597,793, 3,664,793, 3,674,405, 3,919,374, 4,176,153, 4,178,976, Re. 27,155 and patents cited therein.

Some of the methods and apparatus disclosed in the above-identified patents employ an extendable and retractable blowing and filling assembly having means operative on a length of extruded parison in a main mold for blow molding the container body portion through a top opening in the parison.

Alternately, the length of extruded parison may be vacuum molded after cutting to length with a hot knife or the like. After sealing of one end of the molded container, it is filled with a liquid product through the top opening and the top opening sealed to form a filled container. Naturally, a plurality of containers may be simultaneously extruded, formed, filled and sealed in the form of a multi vial card.

Apparatus operating generally in accordance with the teaching of the prior art is sold commercially, for example, model ALP 301 and ALP 624, by Automatic Liquid Packaging, Inc., 2445 East Oakton Street, Arlington Heights, Ill. 60005, U.S.A.

Although the commercial apparatus hereinabove discussed works very well in many applications, it is desirable for using the apparatus in the filling of pharmaceutical liquid products under conditions of Class 100 air as set forth the FDA and hereinabove noted.

In the apparatus hereinabove described, specifically the ALP 301 and ALP 624, when a parison reaches a specific length, a mold closes and the parison is cut by means of an electrically heated knife. The bottom of the parison is sealed to form a vial and the top is held in place with a set holding jaws. Thereafter, a mold carriage transfers the vial molds on the parison head to a position under a filling nozzle which consists of two tubes that descend as a unit into the parison. Vacuum is applied for a specific amount of time which forces the parison out against the walls of the mold cavity forming the main portion of the vial.

The use of a hot knife for cutting the parisons in this filling system creates hundreds of thousands of small particulates which are released into the air of the filling machine, particularly near the location where filling takes place. While the particulates are sterile, it is important that they do not contaminate the vials or the apparatus.

The present invention is directed to an apparatus for retrofitting filling machines, for example, the ALP 301, to meet FDA requirements for Class 100 air at the point-of-fill.

SUMMARY OF THE INVENTION

The present invention is directed to point of fill air system which is an improvement in apparatus for extruding plastic into a length of parison in the form of a vertically oriented hollow tube, molding a container from the parison and filling the container with liquid product.

Apparatus for which the improvement is suitable includes an extruder and a parison head which provides a means for forming the parison, hot knife cutting means for cutting the parison to a selected length with concomitant release of plastic particulates, gripping means for maintaining an opening at a top of the cut parison, sealing means for sealing a bottom of the cut parison, vacuum means for molding the container with a temporary top opening, extendible and retractable nozzle means for filling the mold container to the temporary top opening with the liquid product and sealing means for sealing the filled containers. The improvement according to the present invention includes outer shroud means for surrounding the extruded means, including the parison head, with H.E.P.A. filtered air and an inner shroud in communication with a vacuum exhaust disposed around the parison head which provides a means for preventing particulates from entering the parison upon cutting thereof by the hot knife means.

Finally, a shroud, surrounding the nozzle means, provides a means for directing H.E.P.A. filtered air into the mold container before and during the liquid filling thereof.

In addition, the present invention may include blower means for providing a source of the H.E.P.A. filled air and vacuum means for exhaust in the filtered air.

More particularly, in accordance with the present invention, the inner shroud may include a vacuum input disposed around a bottom of the parison head proximate the temporary top of the parison. In addition, a shroud may include baffle means for directing the H.E.P.A. filtered air upwardly past the parison head, parison and the parison temporary top opening in order to flush the particles upwardly from the parison. In this manner, the particulates are not allowed to settle, accumulate or enter the parison during cutting thereof and the positive air flow therepast ensures that the parison upon being sealed at a bottom end thereof is free of any particulates before and during the filling thereof with product.

The outer shroud may comprise a downwardly extending portion extended to a point below the extruder means and the parison head and the baffle means may comprise a partition disposed within the outer shroud and extending from the vacuum input to a point below the parison head and above a bottom of the outer shroud partition.

More specifically, the vacuum input may be disposed at the top of a zone established around the parison head by the baffle. In addition, the head shroud means may include a partition surrounding the filler means and having a tapered depending portion with outlet means, disposed the nozzle means, for directing the H.E.P.A. filtered air into the mold container via the temporary top opening. In this manner the inside of the containers is maintained free of any contaminants. More particularly, if multiple fill nozzles are utilized, the outlet means in the tapered dependent portion of a third shroud partition may include an elongate slot.

To insure positive consistent air flow within the third shroud, a baffle means may be provided and disposed within the third shroud means partition and adjacent to the input ports in order to prevent channeling of H.E.P.A. air within the third shroud partition and provide uniform flow of air to the outlet means.

BRIEF DESCRIPTION OF THE DRAWINGS

The advantages and features of the present invention would be better understood by the following description when considered in conjunction with the accompanying drawings in which:

FIG. 5 is a representation of air flow apparatus in accordance with the present invention for installation about fill nozzles in accordance with the present invention; and FIG. 6 is a perspective representation of a shroud system providing H.E.P.A. filtered air into containers usual during the filling thereof through the liquid product.

DETAILED DESCRIPTION

Figure 1:
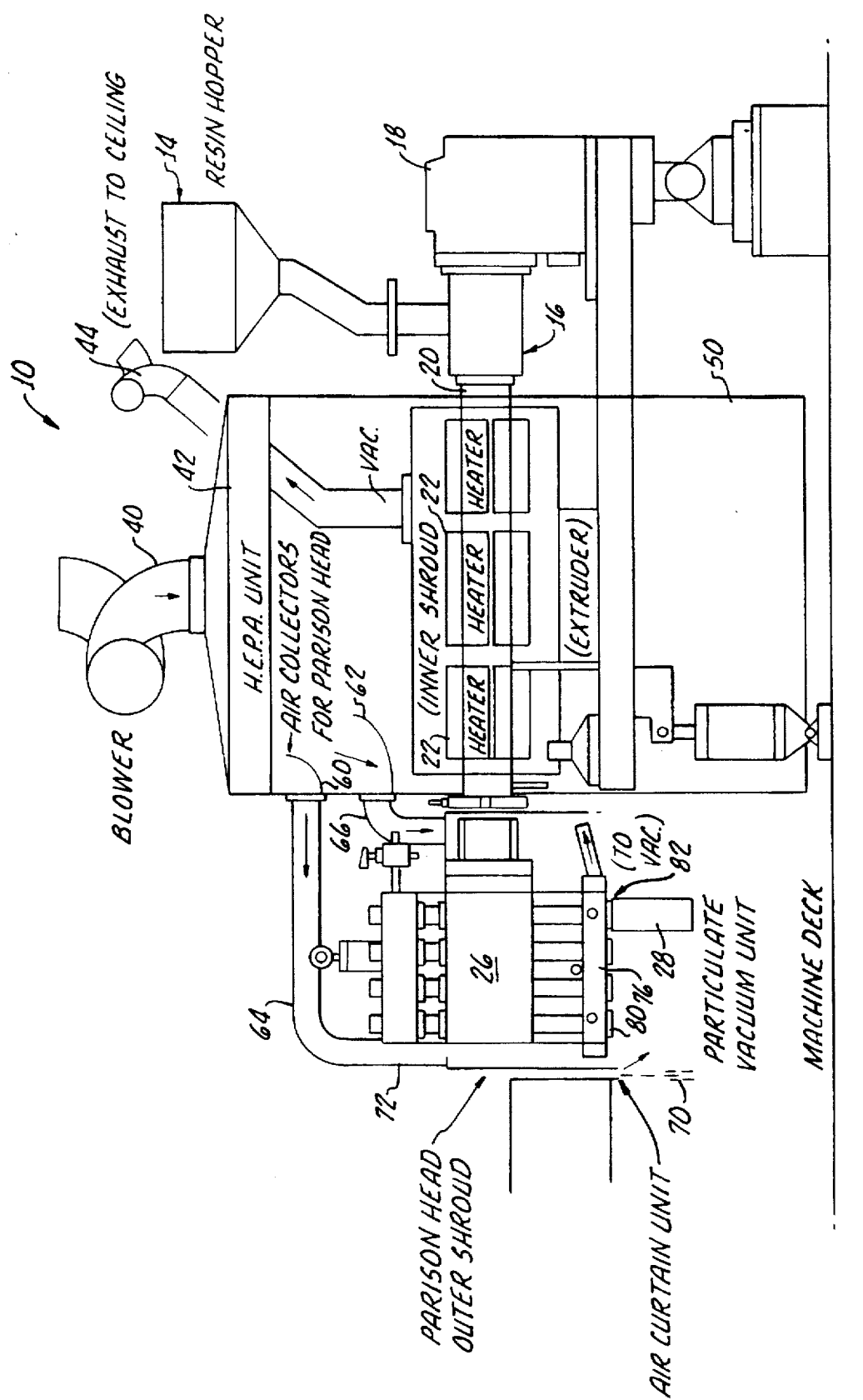
FIG. 1 is a general layout of a suitable extrusion and parison head showing improvements which include a blower and vacuum system for providing an H.E.P.A. air in order to establish Class 100 air conditions.
Figure 2:
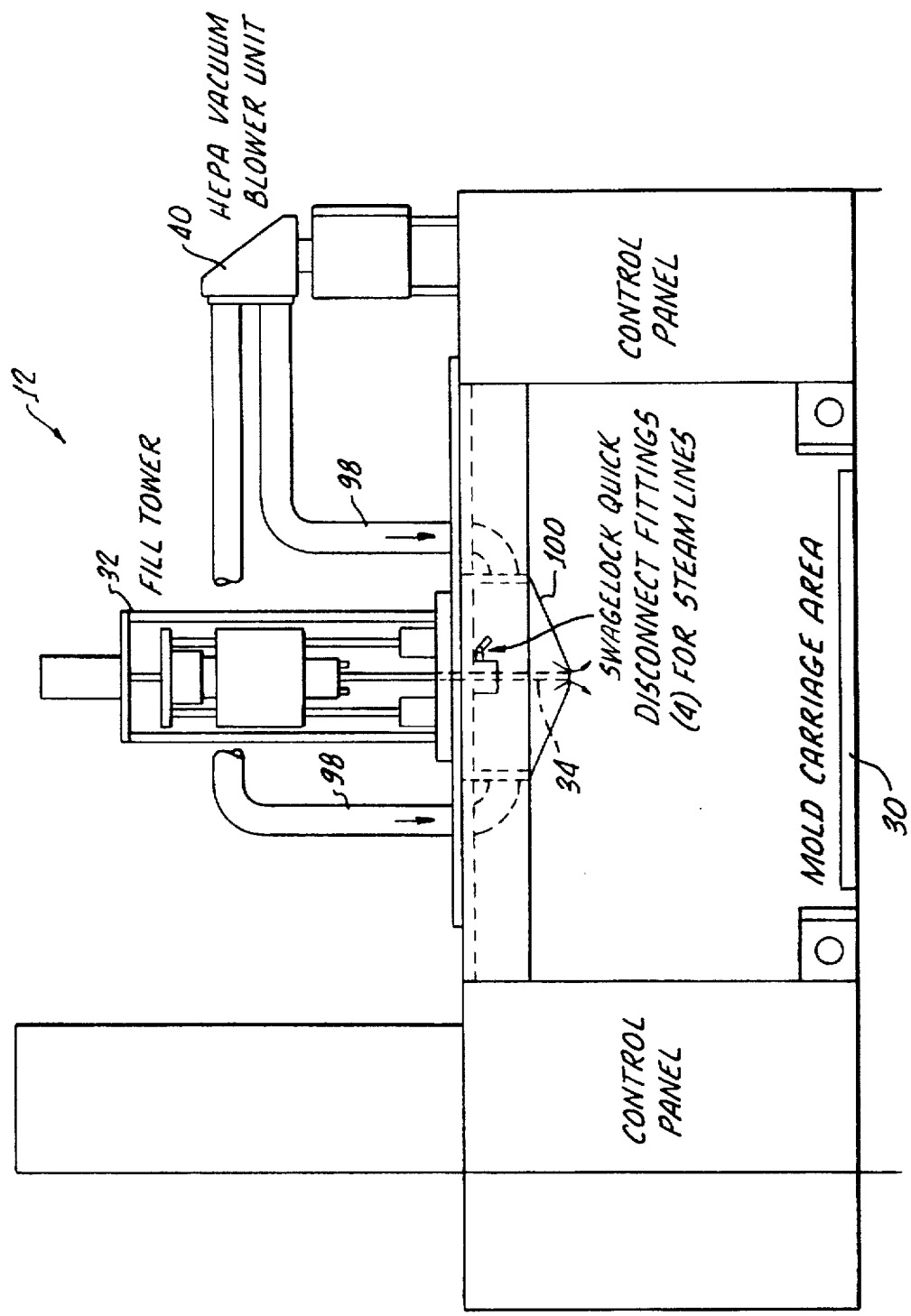
FIG. 2 is a general layout of a filling tower for filling the extruded and molded containers along with the blower and filtered arrangement for supplying H.E.P.A. filtered air in accordance with the improvement of the present invention.

Turning now to FIGS. 1 and 2, and molding machine 10, and fill tower 12 respectively, include various conventional parts or elements of a machine, or machines, sold by Automatic Liquid Packaging, Inc. as hereinabove noted. Further, the various conventional parts or elements are represented schematically and will be recognized by one skilled in the art. Detailed description of the structure of such elements are not necessary to an understanding of the present invention and accordingly are not herein presented for the sake of clarity.

In general, the extruder apparatus 10 includes a hopper 14 for the introduction of plastic material into the extruder 16 which is motor 18 driven and includes a screw (not shown) passing through a cylinder 20 about which various heaters 22 may be disposed in connection with the plasticizing of the material which is thereafter passed to a parison head 26 for the extrusion and forming of parisons 28 in a conventional manner.

As hereinabove noted, and not part of the present invention, when the parison 28 reaches a specific length, a mold carriage (not shown) shuttles beneath the parison head, closes and the parison is cut by means of an electrically heated knife (not shown) to the bottom of the parison 28 is pinched closed and the top held in place with a set of holding jaws (not shown). A mold carriage 30, see FIG. 2 transfers the molded parison 28 through a position beneath fill tower having fill nozzles 34. It should be appreciated that multiple parisons are formed simultaneously and fill tower includes a multitude of nozzles for simultaneously filling of the molded containers 28.

While not being part of the present invention, the fill nozzles 34 consist of two tubes that descend as a unit into the parison 28. Vacuum is applied for a specific amount of time that forces the parison out against the walls of a mold cavity (not shown) forming the main portion of the container. The fill nozzles 34 emit product to be inserted into the formed parison 28 to the specified volume. The nozzles 34 return to their original positions after filling is completed and another set of molds, seal molds, are closed to form a hermetic seal on the set of parison, or vials.

Improvements in accordance with the present invention include a blower which includes an H.E.P.A. filter unit which provides a means for supplying H.E.P.A. filtered air in addition to ducts 44 which, in combination with a blower 46, provides a means for exhausting the filtered air from the apparatus 10 as will be herein described in greater detail.

Figure 3:
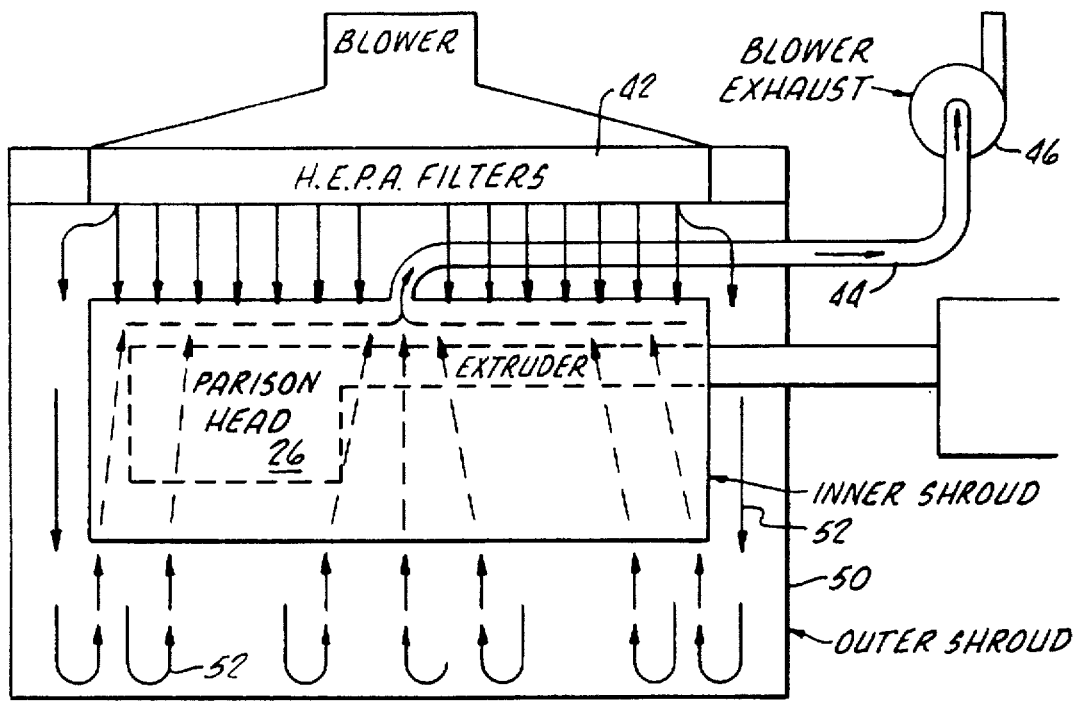
FIG. 3 is a schematic drawing showing a representation form of the air flow improvement in accordance with the present invention.
Figure 4:
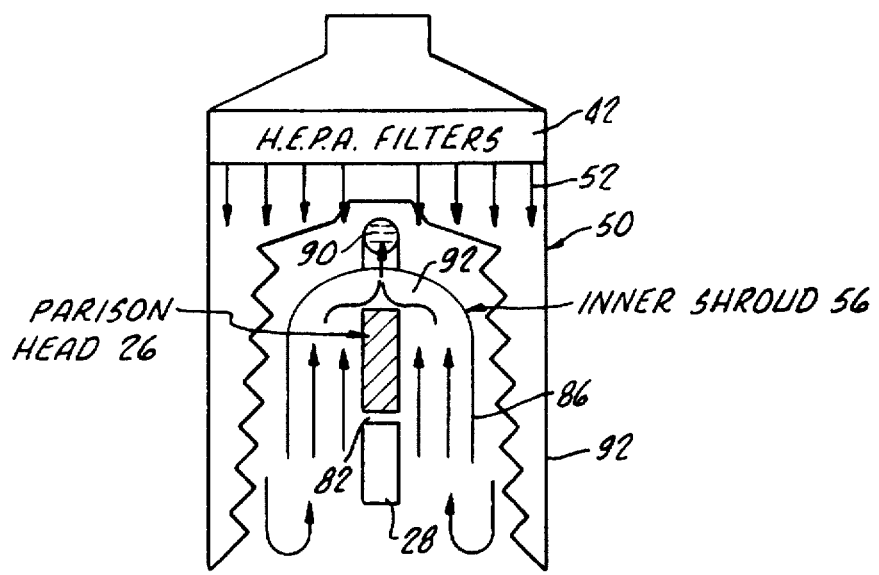
FIG. 4 is a front view of the diagramed apparatus shown in FIG. 3.

As also represented in FIGS. 3 and 4, in accordance with the present invention, an outer shroud 50 provides means for surrounding the extruder 20 including parison head 26 with H.E.P.A. filtered air, the flow of air being indicated by the arrows 52 in FIGS. 3 and 4.

An inner shroud 56 in communication with the vacuum exhaust, or duct 44 and disposed around the parison head provides a means for preventing the plastic particulates from entering the parison 28 while cutting thereof by the hot knife (not shown).

Outer shroud 50 may include vanes 60, 62, see FIG. 1, for directing filtered air through ducts 64, 66 in order to establish an air curtain 70 by means of a depending partition 72.

A vacuum input 76 may be included in the inner shroud 56 around the bottom 80 of the parison head proximate a temporary top 82 of the parison 27. In addition a baffle 86, see FIG. 4, may be provided for directing H.E.P.A. filtered air upwardly past the parison head 26, parison 28 and the temporary top opening 82 in order to flush particulates upward from the parison 28 and exhaust therefore is provided by vacuum input 90 disposed at the top of the zone 92 established around the parison head 26 by the baffle 86. The outer shroud 50 includes a downwardly directed partition 92 which extends to a point below the extruder 22 and parison head 26.

Turning now to FIGS. 2, 5 and 6, H.E.P.A. air provided by the blower 40 to the H.E.P.A. unit, or canister 42 is provided by ducts 98 to a third shroud 100, surrounding nozzles 80 which provides means for directing the H.E.P.A. filtered air into the molded container 28 before and during filling thereof.

A third shroud 100 includes a partition 102 surrounding the fill nozzles 34 which includes a tapered depending portion 104 with outlet 106 proximate in end 108 of the nozzle 34. This provides a means for directing the H.E.P.A. filtered air into the molded container 28 via the temporary top opening 82.

As more clearly shown in FIG. 6 when a plurality of nozzles 34 utilizes the outlet 108 may take a form of an elongate slot subtending to panels 112, 114 of the depending portion 104.

The two ducts are connected to input ports 116 which are encompassed by the shroud 100 as most clearly shown in FIG. 5.

In addition, baffles 120 may be provided and disposed within the third shroud 100 and adjacent each of the import ports 116 in order to prevent channeling of H.E.P.A. air within the third shroud 100 in order to provide uniform flow air as indicated by the arrows 124 in FIG. 5.

Although there has been hereinabove described a specific arrangement of a point of fill air system improvement for a mold and filling apparatus for the purpose of illustrating the manner to which the invention may be used to its advantage, it should be appreciated that the invention is not limited thereto. Accordingly, any and all modifications, variations, or equivalent arrangements which may occur to those skilled in the art, should be considered to be within the scope of the invention as defined by the appended claims.

What is claimed is:

1. In an apparatus for extruding plastic into a length of parison in the form of a vertically oriented hollow tube, molding a container from the parison and for filling the container with liquid product, said apparatus having extruder means, with a parison head, for forming the parison, hot knife cutting means for cutting the parison to a selected length with concomitant release of plastic particulates, gripping means for maintaining an opening at a top of the cut parison, sealing means for sealing a bottom of the cut parison, vacuum means for molding the container with a temporary top opening, extendable and retractable nozzle means for filling the molded container through the temporary top opening with the liquid product and sealing means sealing the filled container, the improvement comprising:

outer shroud means for surrounding the extruder means, including the parison head, with high efficiency particulate air filtered air;

inner shroud means, in communication with a vacuum exhaust and disposed around said parison head, for preventing the particulates from entering the parison upon cutting thereof by the hot knife means; and third shroud means, surrounding the nozzle means, for directing high efficiency particulate air filtered air into the molded container before and during liquid filling thereof.

2. The improvement according to claim 1 wherein said inner shroud means comprises a vacuum input disposed around a bottom of said parison head proximate the temporary top of the parison.

3. The improvement according to claim 2 wherein said inner shroud means further comprises baffle means for directing high efficiency particulate air filtered air upwardly past the parison head, parison and parison temporary top opening in order to flush the particulates upwardly from the parison.

4. The improvement according to claim 3 wherein said outer shroud means comprises a downwardly extending partition extending to a point below said extruder means and parison head.

5. The improvement according to claim 4 wherein said baffle means comprises a partition disposed within said outer shroud means and extending from said vacuum input to a point below the parison head and above a bottom of the outer shroud partition.

6. The improvement according to claim 5 wherein said vacuum input is disposed at a top of a zone established around said parison head by said baffle means.

7. The improvement according to claim 6 wherein said third shroud means comprises a partition surrounding the nozzle means and having a tapered depending portion with outlet means proximate said nozzle means, for directing the high efficiency particulate air filtered air into the molded container via the temporary top opening.

8. The improvement according to claim 7 wherein said outlet means comprises an elongate slot.

9. The improvement according to claim 8 the third shroud means partition encompasses a plurality of input ports for high efficiency particulate air filtered air.

10. The improvement according to claim 9 wherein said third shroud means further comprises baffle means, disposed within the third shroud means partition and adjacent each of the input ports, for preventing channeling of high efficiency particulate air air within the third shroud means partition and providing uniform flow of air to said outlet means.

11. In an apparatus for extruding plastic into a length of parison in the form of a vertically oriented hollow tube, molding a container from the parison and for filling the container with liquid product, said apparatus having extruder means, with a parison head, for forming the parison, hot knife cutting means for cutting the parison to a selected length with concomitant release of plastic particulates, gripping means for maintaining an opening at a top of the cut parison, sealing means for sealing a bottom of the cut parison, vacuum means for molding the container with a temporary top opening, extendable and retractable nozzle means for filling the molded container through the temporary top opening with the liquid product and sealing means for sealing the filled container, the improvement comprising:

blower means for providing a source of high efficiency particulate air filtered air;

vacuum means for exhausting the filtered air;

outer shroud means, in communication with said blower means for surrounding the extruder means, including the parison head, with H.E.P.A. filtered air;

inner shroud means, in communication with said vacuum means and disposed around said parison head, for preventing the particulates from entering the parison upon cutting thereof by the hot knife means; and third shroud means in communication with said blower means and surrounding the nozzle means, for directing H.E.P.A. filtered air into the molded container before and during liquid filling thereof.

12. The improvement according to claim 11 wherein said inner shroud means comprises a vacuum input disposed around a bottom of said parison head proximate the temporary top of the parison.

13. The improvement according to claim 12 wherein said inner shroud means further comprises baffle means for directing high efficiency particulate air filtered air upwardly past the parison head, parison and parison temporary top opening in order to flush the particulates upwardly from the parison.

14. The improvement according to claim 13 wherein said outer shroud means comprises a downwardly extending partition extending to a point below said extruder means and parison head.

15. The improvement according to claim 14 wherein said baffle means comprises a partition disposed within said outer shroud means and extending from said vacuum input to a point below the parison head and above a bottom of the outer shroud partition.

16. The improvement according to claim 15 wherein said vacuum input is disposed at a top of a zone established around said parison head by said baffle means.

17. The improvement according to claim 16 wherein said third shroud means comprises a partition surrounding the nozzle means and having a tapered depending portion with outlet means proximate said nozzle means, for directing the high efficiency particulate air filtered air into the molded container via the temporary top opening.

18. The improvement according to claim 17 wherein said outlet means comprises an elongate slot.

19. The improvement according to claim 18 the third shroud means partition encompasses a plurality of input ports for high efficiency particulate air filtered air.

20. The improvement according to claim 19 wherein said third shroud means further comprises baffle means, disposed within the third shroud means partition and adjacent each of the input ports, for preventing channeling of high efficiency particulate air air within the third shroud means partition and providing uniform flow of air to said outlet means.

\* \* \* \* \*